July 30, 1957 E. J. JAHNEL ET AL 2,800,858
CONTROL MECHANISM FOR ENGINE WITH PUMP TAKE-OFF EQUIPMENT
Filed Oct. 5, 1953
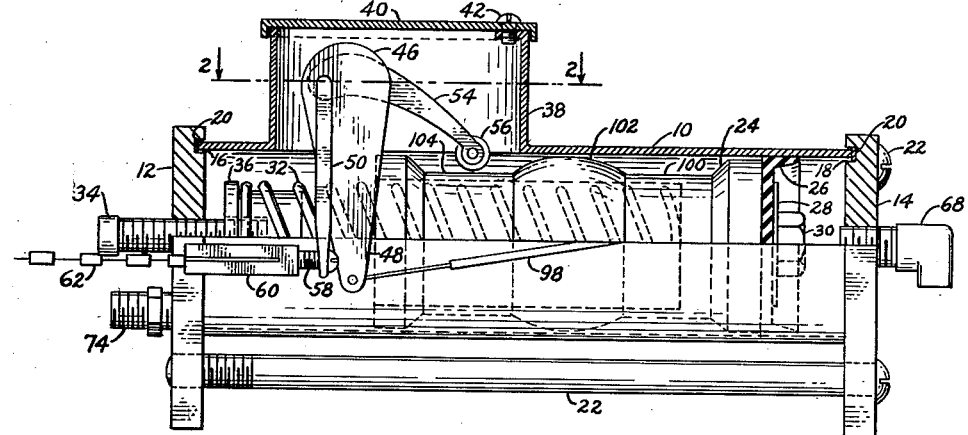
Fig. 1
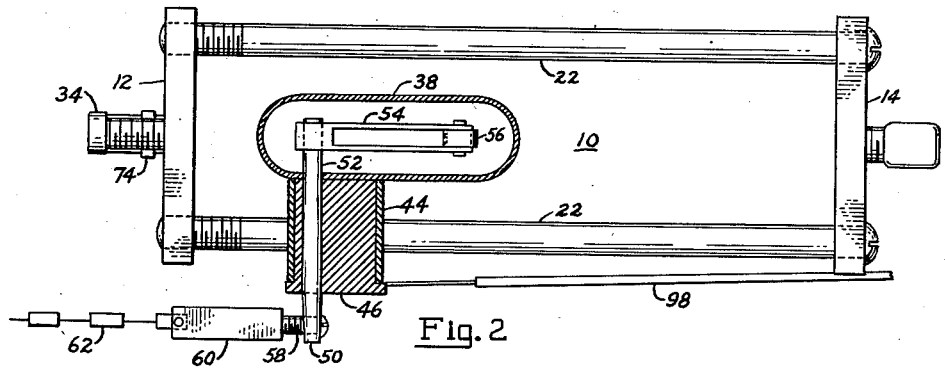
Fig. 2
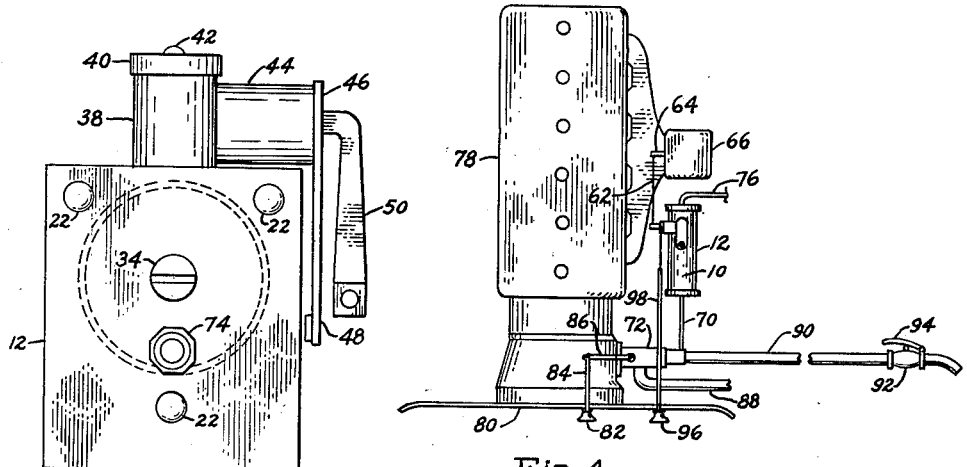
Fig. 3
Fig. 4
INVENTORS
E. J. JAHNEL
E. DUMONTE
BY Arthur O. Andersen
Atty.

United States Patent Office 2,800,858
Patented July 30, 1957

2,800,858

CONTROL MECHANISM FOR ENGINE WITH PUMP TAKE-OFF EQUIPMENT

Edwin J. Jahnel, Coon Valley, and Edmund Dumonte, Wausau, Wis.

Application October 5, 1953, Serial No. 384,022

3 Claims. (Cl. 103—16)

This invention relates to control mechanism for the engine of a vehicle where a pump is driven by the engine through a take-off mechanism which can be engaged or disengaged by the operator.

With petroleum delivery trucks not equipped with the control of this invention, it is necessary for the operator to set the engine throttle for an engine speed higher than the normal idling speed of the engine in order to drive the pump at a speed which will result in an economical rate of delivery. On arrival at the destination, the operator sets the throttle at this high speed and then makes the connection of the hose to the filler pipe of the tank to be filled. During this time the engine speed is unnecessarily high with the result that there is a waste of engine fuel, unnecessary wear on the engine and pump, and unnecessary noise.

The control of this invention permits the operator to engage the pump take-off and to put the control in operation on arrival at destination. The control permits the engine to operate at normal idling speed until the valve is opened in the hose at which time the control increases the throttle of the engine to increase its speed and that of the pump driven thereby to give an economical rate of delivery.

It is an object of this invention to provide a control for an engine driven pump which increases the speed of the engine when fluid is permitted to flow from the discharge side of the pump.

It is another object of this invention to provide means for rendering the control operative or inoperative.

It is another object of this invention to provide a control device which is simple and inexpensive to manufacture, easy to service, and safe in operation.

The foregoing and other objects of the invention will appear from the following detailed description of the preferred embodiment of the invention, when considered in connection with the drawing in which:

Fig. 1 is a side view partly in section showing the control mechanism of this invention.

Fig. 2 is a top view partly in section on line 2—2 of Fig. 1.

Fig. 3 is an end view looking from the left in Fig. 1.

Fig. 4 is a view showing the arrangement of the control with respect to the vehicle and the engine of the vehicle.

Referring now to the drawings, numeral 10 designates a fluid cylinder which is closed at its ends by plates 12 and 14 which have circular grooves 16 and 18 which contain gaskets 20 of neoprene or other flexible sealing material. Three bolts 22 extend through plate 14 and have their ends in threaded engagement with plate 12 to hold the cylinder 10 and plates 12 and 14 in rigid leak proof assembly.

Fluid cylinder 10 has a piston 24 slidably mounted therein. A flexible cup sealing member 26 of neoprene or other suitable material is secured to one end of the piston 24 by washer 28 and bolt 30. Bolt 30 is in threaded engagement with piston 24. A spring 32 is telescopically mounted in piston 24 and urges the piston toward the right in Fig. 1. The tension of spring 32 is adjustable by means of screw 34 which is in threaded engagement with end plate 12. A spring abutment member 36 is engaged by the end of screw 34 so that adjustment of screw 34 moves abutment member 36 to adjust the tension in spring 32.

Secured to and extending upwardly from cylinder 10 is a housing 38 which has a cap 40 secured thereto by a screw 42.

Extending outwardly from one side of the housing 38 is a bearing 44 which rotatably supports an eccentric 46 which has an arm 48 extending downwardly therefrom. An arm 50 has a shaft 52 rotatably mounted in eccentric 46. An arm 54 is secured on shaft 52 and has a roller 56 rotatably secured to its outer end.

Arm 50 has a hole at its outer end which receives a screw 58. A connector 60 is threadedly secured at one end to screw 58. Connector 60 is secured at its other end to a chain 62 which in turn is secured to the throttle lever 64 of carburetor 66.

End plate 14 threadedly receives an elbow fitting 68 to which is secured a conduit 70 which is connected at its other end to the discharge side of pump 72. Fluid pressure is therefore conducted from the discharge side of pump 72 through conduit 70 and elbow fitting 68 to the interior of cylinder 10.

End plate 12 threadedly receives a fitting 74 which is secured to a conduit 76 which extends from fitting 74 to a point below the engine compartment. If any liquid leaks past the sealing member 26, it is conducted through fitting 74 and conduit 76 to a safe point below the vehicle.

Fig. 4 shows the engine 78 and the dashboard 80 of the vehicle. A knob 82 on the dashboard is connected by a Bowden wire 84 to a lever 86. The operator causes pump 72 to be driven by the engine 78 by pulling knob 82 out from the dash. This movement of knob 82 moves lever 86 counterclockwise to drivingly connect pump 72 to the engine 78. The intake passageway of pump 72 is connected to a pipe 88 which is connected to receive liquid from the storage tank of the vehicle. The pump 72 delivers liquid to a hose 90 which has a valve 92 at its outer end. Valve 92 is opened by manual movement of handle 94.

A knob 96 is mounted on the dashboard and is connected by a Bowden wire 98 to the outer end of arm 48. When knob 96 is pushed in against the dashboard, arm 48 is moved clockwise from the position shown in Fig. 1 to raise shaft 52 and roller 56 so that roller 56 cannot be contacted by piston 24 and the throttle cannot be increased by the piston 24 regardless of the position of piston 24 in the cylinder 10.

The operation of the apparatus will now be described. When the vehicle is being driven the knob 82 is pushed in so that the pump 72 is disengaged from the engine and is at rest. The knob 96 is also pushed in so that roller 56 cannot be moved by the piston 24 and therefore the apparatus cannot increase the throttle of the engine even when there is pressure in the cylinder from a previous operation of the pump.

Upon arrival at the destination where fluid is to be pumped from the vehicle to a storage tank, the operator pulls out the knob 82 to engage the pump 72 with the engine so that it is driven thereby. The operator also pulls knob 96 outwardly from the dash to lower roll 56 to a position in which it can be moved by piston 24. Since valve 92 is closed the pressure from pump 72 forces piston 24 to the left in Fig. 1 until roller 56 is bearing on portion 100 of piston 24. With the roller 56 in this position, the chain 62 does not change the position of the throttle lever 64 and the engine 78 runs at its normal idling speed. When the operator is ready to fill the tank he presses down on valve handle 94 to open valve 92 and discharge fluid from hose 90 into the tank. With valve 92 open the pressure at the discharge side of the pump 72 is reduced and consequently the pressure in line 70 and in cylinder 10 is reduced. When the pressure in cylinder 10 is reduced, spring 32 moves piston 24 to the right in Fig. 1 and roller 56 bears on portion 102 of piston 24. It can be seen that this movement of piston 24 causes arms 54 and 50 to move counterclockwise. Arm 50 through screw 58, connector 60, and chain 62 pulls on throttle lever 64 to increase the speed of the engine 78 and the speed of pump 72 driven thereby.

When the operator releases handle 94 to close valve 92 at the completion of a delivery, the pressure at the discharge side of pump 72 increases and piston 24 is moved to the left to a position in which roller 56 engages portion 100 of piston 24 and the engine is returned to idling speed. The operator then puts the hose back on the vehicle and moves knob 82 against the dash to disengage pump 72 from the engine. With the pump 72 at rest, the pressure at the discharge side of pump 72 will usually fall due to leakage past the pump. With a fall in pressure the piston 24 is moved to the right by spring 32 so that roller 56 engages portion 104 of piston 24 and throttle lever 64 is in idling position. However, in order to prevent the control from increasing the throttle while the vehicle is being driven, the operator also pushes knob 96 against the dashboard to prevent the piston 24 from exercising any control over the throttle. It is desirable to render the control inoperative in this manner to prevent high speed operation of the engine in the event that the pump is accidently engaged or in the event that a check valve in pipe 88 maintains pressure at the discharge side of the pump when the pump is at rest.

Having thus described a particular embodiment of our invention, we contemplate that many changes in the details of construction may be made without departing from the scope and spirit of the invention and we desire to be limited only by the claims.

We claim:

1. In combination, an engine having a throttle, a pump connected to said engine, control apparatus comprising a cylinder, a piston mounted for reciprocation in said cylinder, a conduit connected to said cylinder and to the discharge side of the pump to communicate pump pressure to said cylinder, a spring opposing movement of the piston, cam means on said piston, an eccentric pivotally mounted on said cylinder, a follower pivotally mounted on said eccentric, means connecting said follower to the throttle of the engine to adjust the throttle, and means for pivotally adjusting said eccentric to selectively move said follower into and out of engagement with said cam means.

2. In a control mechanism for an engine having a pump connected to be driven thereby, the combination of a throttle connected to said engine and adapted to control the speed of said engine, a piston, a cylinder in which said piston is mounted for reciprocation, a conduit extending from said cylinder to the discharge side of the pump to communicate pump pressure to said cylinder, spring means opposing movement of said piston, cam means on said piston, said cam means having two spaced surfaces parallel to the axis of said piston and a salient portion between said two spaced surfaces, a follower pivotally mounted on said cylinder in engagement with said cam means, means connecting said follower to the throttle of the engine to adjust said throttle to idling position when said follower is in engagement with either of said spaced surfaces of said cam means and to increase the setting of said throttle when the follower is in engagement with the salient portion of said cam means.

3. In combination, an internal combustion engine having a throttle, a pump connected to said internal combustion engine, control apparatus comprising, a fluid chamber connected in fluid communication with the discharge of said pump, fluid pressure actuated means in said fluid chamber, a cam secured to said fluid pressure actuated means, an eccentric pivotally secured to said fluid chamber, a follower pivotally mounted on said eccentric, means connected to said follower and to the throttle of said internal combustion engine to transmit movement of said follower to the throttle of said internal combustion engine, and manual means connected to said eccentric to pivotally adjust said eccentric to selectively move said follower into and out of engagement with said cam.

References Cited in the file of this patent

UNITED STATES PATENTS

| | | |
|---|---|---|
| 1,060,650 | Turner | May 6, 1913 |
| 1,725,273 | Hollander | Aug. 20, 1929 |
| 2,079,781 | Walker | May 11, 1937 |
| 2,258,278 | Carpenter | Oct. 7, 1941 |
| 2,634,681 | Rowell | Apr. 14, 1953 |